United States Patent [19]
Grise et al.

[11] Patent Number: 5,663,806
[45] Date of Patent: Sep. 2, 1997

[54] NON-DESTRUCTIVE TARGET MARKING FOR IMAGE STITCHING

[75] Inventors: Gary Grise, Colchester; Jerzy M. Zalesinski, Essex Junction, both of Vt.

[73] Assignee: International Business Machines Corp., Armonk, N.Y.

[21] Appl. No.: 538,542

[22] Filed: Oct. 3, 1995

[51] Int. Cl.⁶ .......................... H04N 1/04; H04N 1/047; H04N 1/10; H04N 1/053
[52] U.S. Cl. .......................... 358/406; 358/474; 358/494; 358/497; 382/287
[58] Field of Search .......................... 358/406, 474, 358/486, 487, 488, 494, 496, 497; 382/287; 348/333

[56] References Cited

U.S. PATENT DOCUMENTS

| | | | |
|---|---|---|---|
| 4,256,959 | 3/1981 | Monette | 250/235 |
| 4,514,063 | 4/1985 | Wang et al. | |
| 4,641,357 | 2/1987 | Satoh | 358/497 |
| 4,695,722 | 9/1987 | Motooka | 250/235 |
| 4,814,626 | 3/1989 | Doemens et al. | |
| 4,993,778 | 2/1991 | Tufano et al. | 358/488 |
| 5,144,448 | 9/1992 | Hornbaker, III et al. | |
| 5,144,455 | 9/1992 | Stein et al. | 358/474 |
| 5,241,187 | 8/1993 | Ikeda et al. | |
| 5,539,532 | 7/1996 | Watanabe | 358/486 |

*Primary Examiner*—Scott A. Rogers
*Attorney, Agent, or Firm*—Thornton & Thornton; Francis J. Thornton; Eugene Shkurkto

[57] ABSTRACT

A scanner using a small, inexpensive CCD array for accurately and easily re-creating an error free reproduction of any scanned image wherein a plurality of laser alignment marks are temporarily projected, from an inexpensive solid state laser via a low cost plastic fiber optic cable, onto the surface of the document, and capturing the image as a number of small segments, along both the horizontal and vertical dimensions of the document onto the surface of the image being scanned. These temporary, projected, alignment marks permit the accurate positioning of adjacent, scanned segments during reconstruction of the scanned document. This scanner can scan documents of any width with an accuracy such that the scanned document can be readily, easily and accurately reassembled regardless of the insensitivity of, or misalignment of the scanning array in the apparatus or the skew of the document relative to the camera doing the scanning.

10 Claims, 6 Drawing Sheets

NON-DESTRUCTIVE TARGET MARKING FOR IMAGE STITCHING

FIELD OF THE INVENTION

The present invention relates generally to the field of input scanners and more particularly to scanners requiring multiple vertical and horizontal positions of the scanning head to read the entire image.

BACKGROUND OF THE INVENTION

Document scanners generally use an imaging or optical recognition device. In use, the device is placed over the document to be scanned and any image on the document is converted by the device into electrical impulses and stored. After the document has been viewed the stored image can be fed into a suitable printer and the document re-created.

Charge coupled device (CCD) arrays, are commonly used as the imaging or optical recognition device. Such CCD arrays are cheap, have good resolution and are readily available but because of cost and difficulty in manufacturing, are generally less than 5 inches in length and ½ inches in width.

The use of such an array; in a scanner, requires either; a vertical traversal of the array down the length of the sheet being scanned to capture a vertical strip of the document, followed by a horizontal movement of the array so that the next adjacent vertical strip of the document can be scanned and captured; or a horizontal traversal of the array across the width of the sheet being scanned to capture a horizontal line of the document, followed by a vertical movement of the array so that the next adjacent horizontal line of the document can be scanned and captured.

In both cases the procedure requires the taking and storing a plurality of images which must then be matched, aligned and reassembled.

Many good, inexpensive, mechanical arrangements exist for accurately traversing the optical imaging device down the length or vertical dimension of the document so that accurate matching of the re-created images can be achieved. However, problems are found in the matching of the images in the horizontal dimension of the document, especially if the scanned document is skewed with respect to the horizontal orientation of the array, for the re-creation of error free images requires an alignment accuracy, between each of the array's horizontal position, of one pixel which is typically between 0.0016 and 0.00042 inches on the surface being scanned. Good, inexpensive, mechanisms that will achieve this required accuracy for horizontal positioning of the array are not available.

In an, attempt to avoid the horizontal traversing problems discussed above, CCD arrays have been made wide enough to scan a desired page. Such wide arrays have the advantage of scanning, for example, an entire line in a single pass thus avoiding the problem of horizontal stitching of the image but have the disadvantage of increased cost and, in the case of wide engineering or architectural drawings, decreased resolution, i.e., less than 200 dots per inch (DPI).

One attempt to avoid these problems is to physically align a plurality of small arrays so that the line of arrays will capture, as a single image, a horizontal strip of a document. By using smaller arrays, good image resolution is realized but again the re-creation of error free images requires, between each of the arrays in the line, an alignment accuracy of a few pixels. Such an accurate alignment, in such equipment, is possible to achieve in a laboratory but virtually impossible to maintain when the scanners are used in the commercial world. Shock, mechanical movement of the scanners, or etc. that the equipment may be subject to, during actual use, will cause the arrays to become misaligned and the required accuracy lost.

Accordingly, the art has been searching for a scanner using a small, high resolution CCD array that will accurately and easily re-create an error free reproduction of a scanned image of any size.

SUMMARY OF THE PRESENT INVENTION

The present invention solves the above difficulties and provides a scanner using a small, CCD array that has a high resolution, i.e., a resolution greater than 200 DPI, that will accurately and easily re-create an error free reproduction of a scanned image of any size.

The present invention achieves this by focusing a plurality of temporary laser alignment marks on the surface of the image being scanned so that a single, inexpensive high resolution CCD array, less than four inches in width, can scan a document of any width and readily, easily and accurately reassemble the scanned document regardless of the insensitivity, or misalignment of the array in the apparatus or the skew of the document.

The present invention, instead of relying on complex mechanical arrangements to accurately locate the scanned images, thus uses a temporary optical alignment mark to accurately and easily locate each captured image to within a few pixels of any adjacent captured image so that, each captured image taken from the scanned document can be readily, easily and accurately reassembled.

Still further the present invention requires but minimal focusing requirements, inexpensive mechanical arrangements for scanning documents of any width including large detailed architectural and engineering drawings and simple programs for storing and accurately re-creating the stored images.

In the present invention the above advantages are achieved by positioning a plurality of individual laser light sources on the document to be scanned and scanning the document. The scanning device recognizes and uses the impinging laser light beams as alignment marks regardless of the position of the CCD array and regardless of the skew of the document being scanned.

The present invention permits the document image to be captured as small easily locatable segments along both the horizontal and vertical dimensions.

The present invention is also permits combining of scanning and printing heads to achieve a printer/scanner/fax integrated office document processor, which would be particularly advantageous for the adaptation of large CAD drawings, map scanning, editing and printing on a single machine.

The present invention is thus directed toward a method which provides for image reconstruction, by using fugitive alignment marks which are temporarily applied to the document being scanned. Thus the present invention avoids the need for a highly accurate mechanical carriage movement assembly.

The present invention uses a low cost carriage assembly equivalent to that presently used on relatively inexpensive infract print heads and forms the temporary or fugitive alignment marks with a low cost plastic fiber optic cable coupled to an inexpensive solid state laser.

These and other objects and features of the present invention will become further apparent from the following description taken in conjunction with the drawings.

DESCRIPTION OF THE DRAWINGS

FIG. 12 shows a section through a printing head that may be coupled to the scanning head shown in FIG. 2 in order to use the same apparatus to both scan a document and to print a scanned document.

DESCRIPTION OF THE PREFERRED EMBODIMENT

Figure 1:
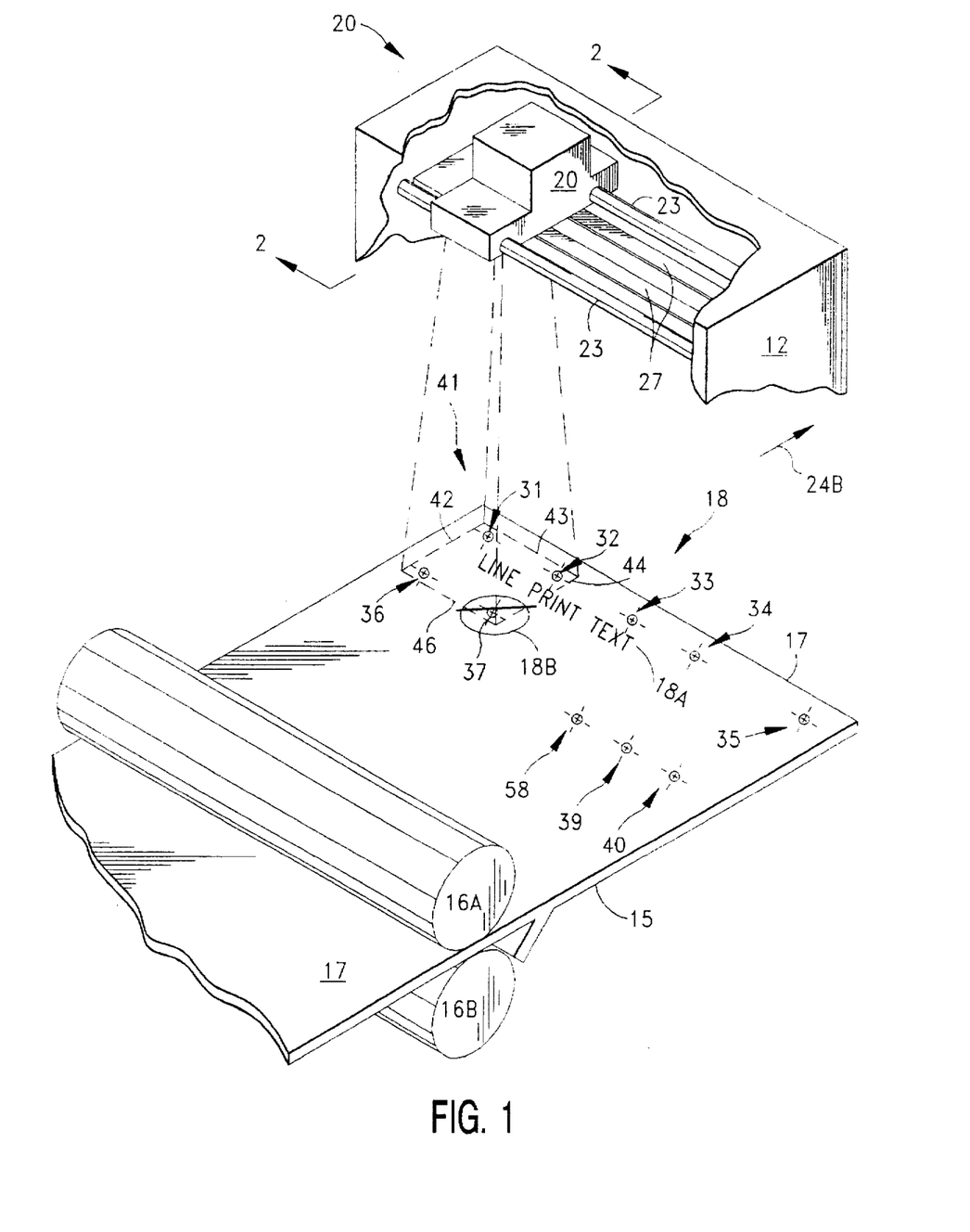
FIG. 1 illustrates a broken away view of a scanner employing the present invention.
Figure 2:
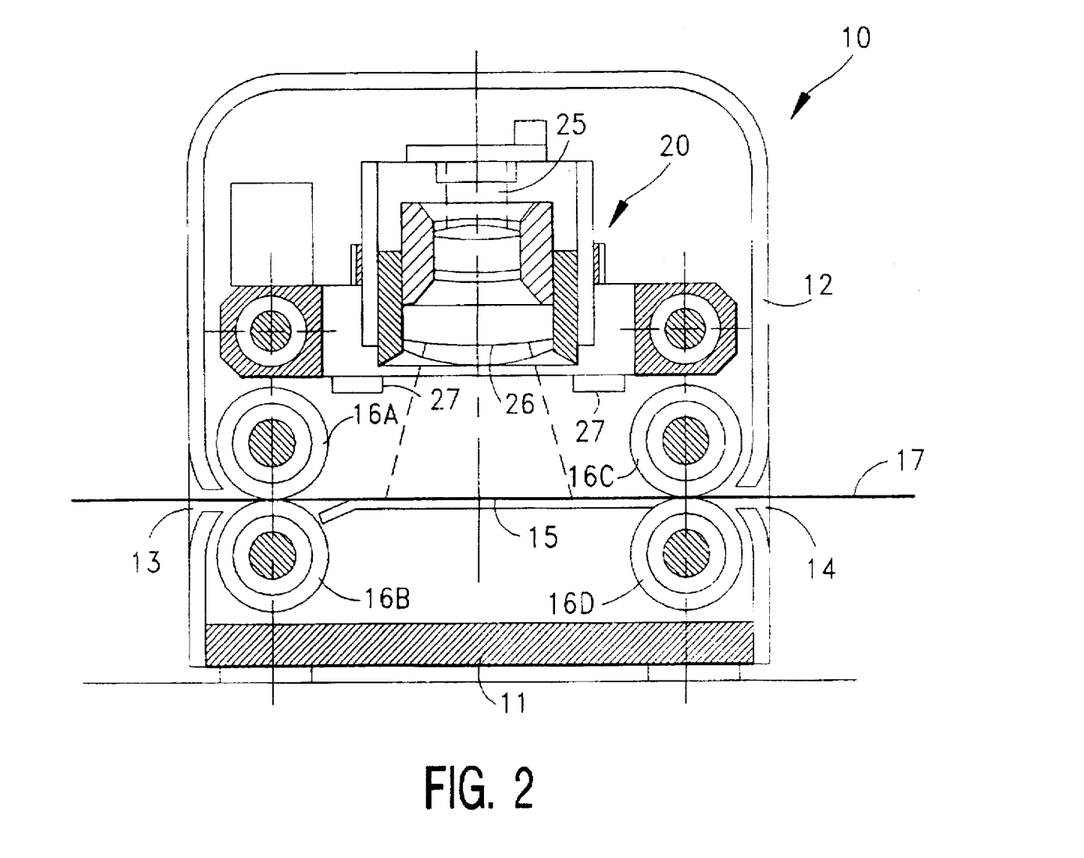
FIG. 2 shows a section through a scanner camera of FIG. 1 taken along the lines 2—2.

FIG. 1 shows a broken away partial view of a scanner 10 employing the present invention and FIG. 2 show a section through the scanner 10 taken along the lines 2—2. As shown in these Figs. the scanner 10 is comprised of a base 11 carrying a housing 12 provided with slots 13 and 14, in opposite sides thereof. In the housing 12 there is disposed a platen 15 in line with the inlet slot 13 and the outlet slot 14. The platen 15 is in line with drive rollers 16A, 16B, 16C, and 16D arranged on either side of the platen 15. These rollers are arranged and driven by a motor (not shown) such that when a document or sheet 17, bearing an image to be scanned, is fed into slot 13 they will position and transfer the sheet 17 over the platen 15 and index the sheet through the scanner at a fixed rate.

A sample sheet 17 is shown, in both FIGS. 1 and 2, positioned above the platen 15 and between the rollers. On this sheet 17 there is disposed an image 18 to be scanned. The image 18 is, shown in FIG. 1, as a printed line of data 18A and a symbol 18B. It should be understood that other images, such as additional lines of type, additional drawings, photographs, or the like can also be on the sheet 17 and can be scanned.

Disposed over the platen 15 and the sheet 17 is a camera carriage or scanning head 20 which incorporates the present invention.

This camera carriage 20 is mounted by suitable bearings 22 on a pair of parallel bars 23. The carriage 20 can be moved back and forth along these bars in both directions as shown by the arrow 24A in FIG. 1. However, when the camera carriage 20 is at the left end of the bars 23, as shown in FIG. 1 it is in its home position. This carriage 20 is incrementally moved or stepped along the rails 23 and hence across the paper, from its home position, by any suitable means such as electric stepping motor 19.

The camera carriage 20 has incorporated therein an optical reading element 25 of suitable resolution, i.e., a CCD array, and a suitable lens 26. As is well known to the art suitable electronic systems such as a controller (not shown) is coupled to the CCD array for recording the information detected by the CCD array. The height at which the camera 20 is held above the sheet 17 together with the design of the lens 26 and the optical recognition device 25 used in the camera establishes the size of the field of view 41 scanned by the camera in any one position.

This field of view 41 is designated in FIG. 1 as being bounded by the dotted lines 42, 43, 44, and 45. By design, this field is made substantially square and encompasses four of the projected laser alignment marks. This field of view need not be square or rectangular, but can, if necessary, be configured differently, i.e., made circular by positioning a suitable mask, not shown, beneath the lens 47.

Beneath the camera carriage 20 is positioned a pair of projectors 27 which are provided for projecting a double row of light beams onto the sheet 17. These light beams may, for example, be laser beams, are configured to form the alignment marks. As shown, a double row of alignment marks 31, 32, 33, 34, 35, 36, 37, 38, 39, and 40 are projected on the sheet 17. It should noted that two of the marks, i.e., marks 31 and 32, of the upper row of alignment marks 31 to 35 fall near the upper edge of the field of view 41 and another two of the marks, i.e., marks 36 and 37, of the lower row of marks 36 to 40 fall near the lower edge of the field of view 41.

These projectors 27, although projecting the marks within the field of view 41, are independent of the camera and preferably positioned on either side of the camera, parallel to the rails 23, such that they do not interfere with the field of view of the camera or with the movement of the camera.

Figure 3:
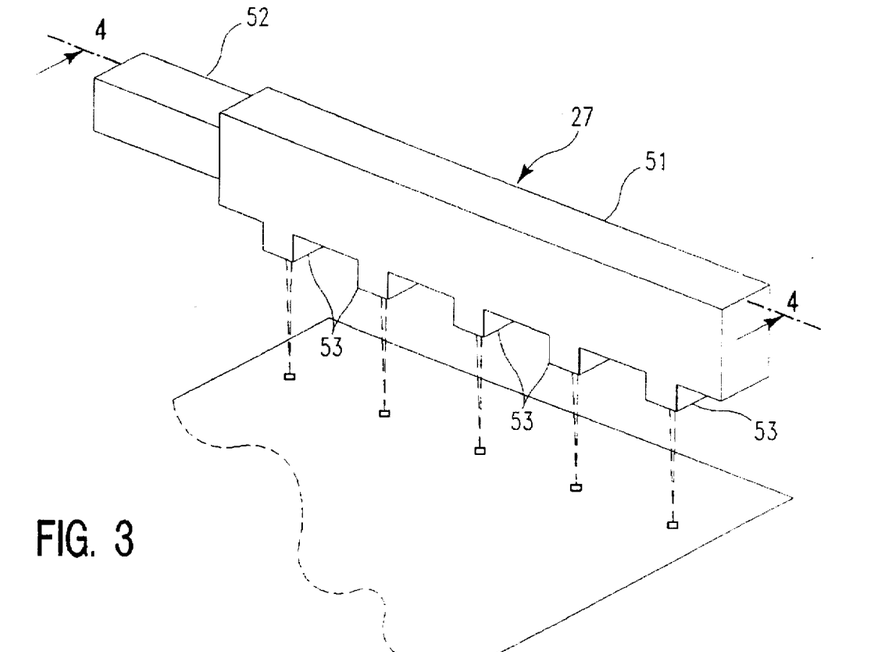
FIG. 3 shows an apparatus for projecting, on the document to be scanned, the fugitive alignment marks.
Figure 4:
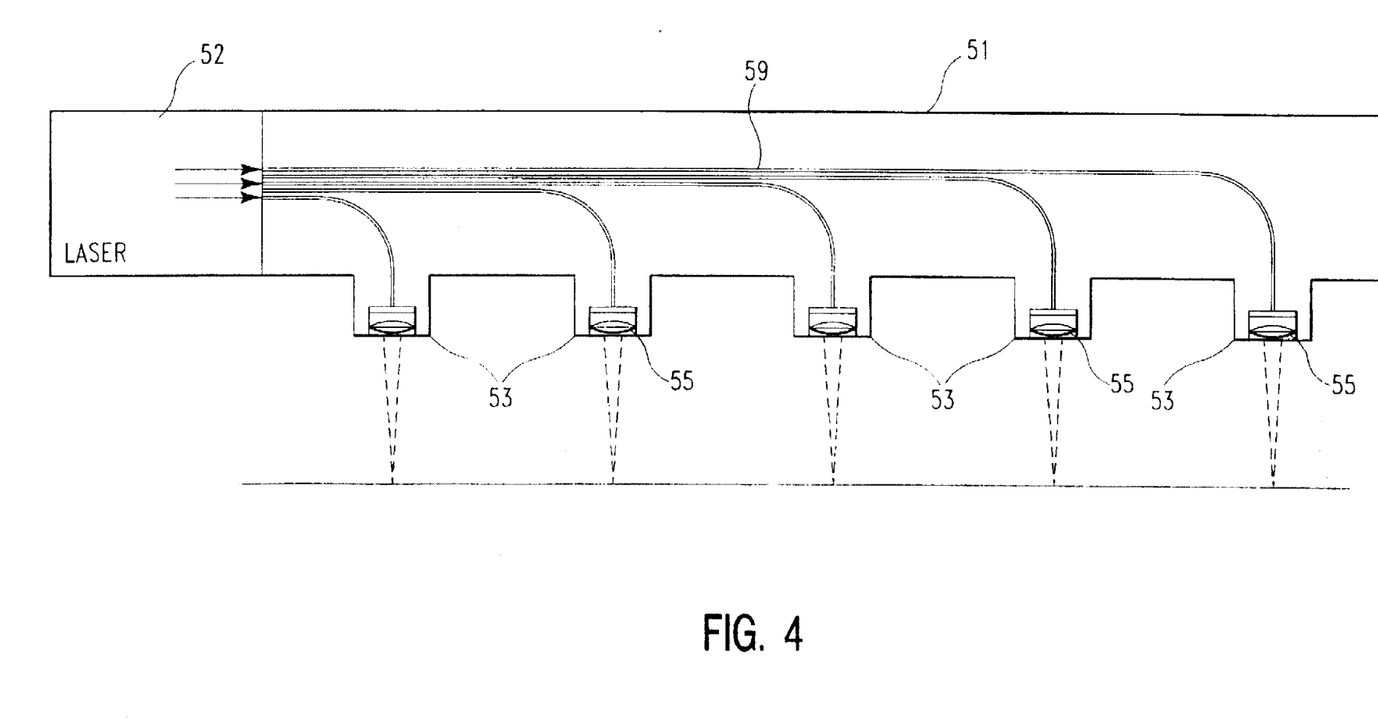
FIG. 4 shows a section through the apparatus of FIG. 3 taken along the lines 4—4.

FIGS. 3 and 4 show one of the projectors 27 in greater detail. FIG. 4 shows a section through the projector of FIG. 3 along the lines 4—4. Each projector 27 is basically a hollow tube 51 having a laser 52 affixed to one end and a plurality of outlets 53 arranged perpendicular to the longitudinal axis of the tube 51. The laser 52 is coupled to one end of each optical fiber in a bundle 54 of optical fibers. The other end of each fiber in the bundle is connected to a respective lens 55. Each lens is respectively positioned in a respective outlet 53. The laser beam is passed, from the laser 52, through each fiber in the bundle and through the respective lens and thence is projected onto the sheet 17. These laser beams, when projected on the paper 17, appear as the temporary alignment spots 31 through 40 as shown in FIG. 1.

Turning now to FIGS. 5, 6, 7, 8, 9, and 10 the reading of the sheet 17 with the present invention and its re-creation will be more fully described.

Figure 5:
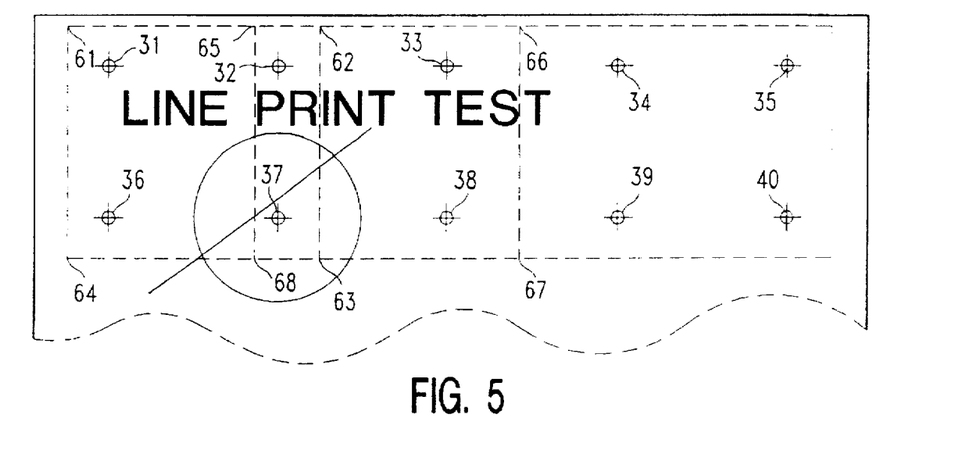
FIG. 5 is an enlarged view of the top portion of the document shown in FIG. 1 showing the first rank of images to be scanned.
Figure 6:
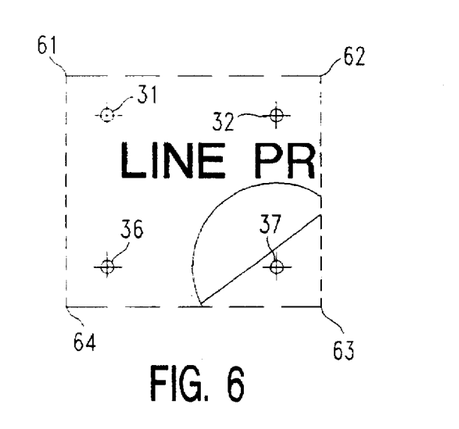
FIG. 6 shows the first image taken from the document of FIG. 5 as it would be recorded by the scanning head of the present invention.
Figure 7:
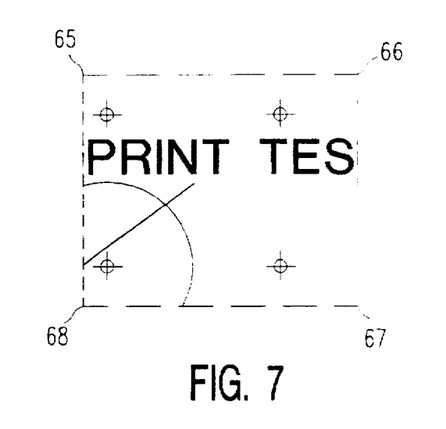
FIG. 7 shows the second image taken from the document of FIG. 5 as it would be recorded by the scanning head of the present invention.
Figure 8:
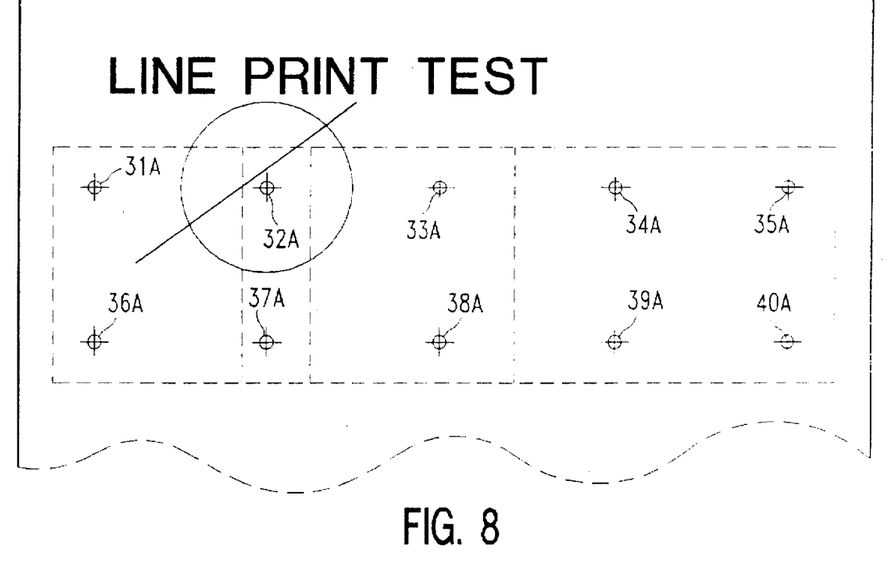
FIG. 8 shows the next lower portion of the document shown in FIG. 1 and depicts the second rank of images to be scanned.
Figure 9:
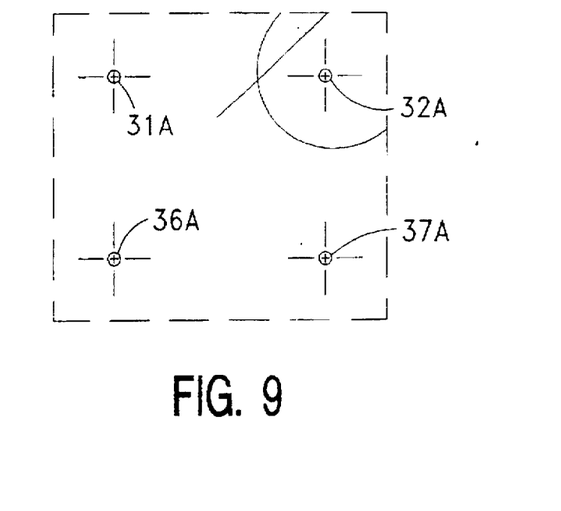
FIG. 9 shows the first image taken from the second rank depicted in FIG. 8.
Figure 10:
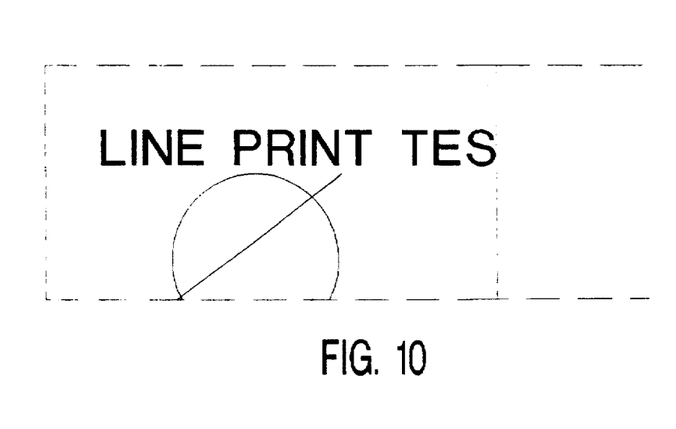
FIG. 10 shows the images of FIGS. 6 and 7 reconstructed on a new piece of paper.

FIG. 5 is an enlarged view of the top portion of the sheet 17 of FIG. 1. FIG. 6 shows the first image taken from the first rank of the sheet 17 of FIG. 5 as recorded by the scanning head of the present invention. FIG. 7 shows the second image taken from the document of FIG. 5 as it would be recorded by the scanning head of the present invention. FIG. 8 shows the next lower portion of the document shown in FIG. 1 and depicts the second rank of images to be scanned. FIG. 9 shows the first image taken from the second rank depicted in FIG. 8. FIG. 10 shows the images of FIGS.

Figure 11:
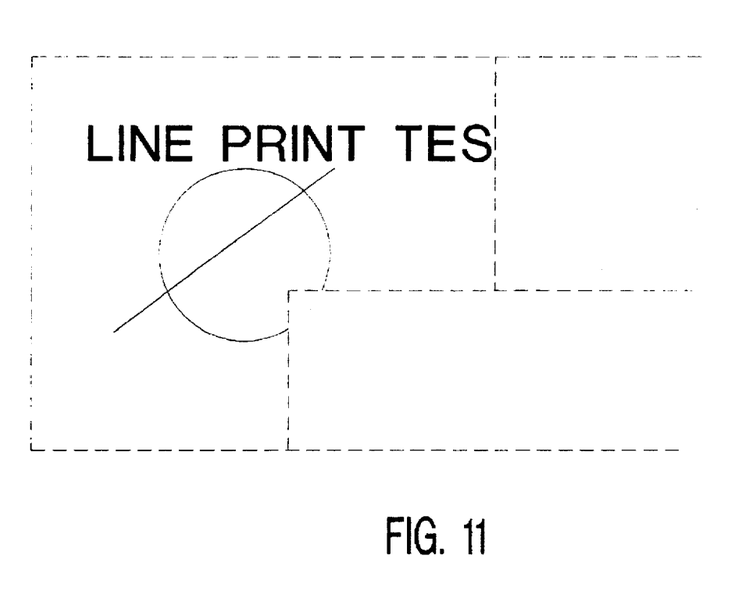
FIG. 11 shows the images of FIGS. 6, 7 and 9 reconstructed on a new piece of paper.

6 and 7 reconstructed on a new piece of paper. FIG. 11 shows the images of FIGS. 6, 7 and 9 reconstructed on a new piece of paper.

As shown in FIG. 5 the camera is initially positioned on the left side of the system, i.e., the home position. Thus, as shown, the camera carriage is positioned over the top left corner of the sheet 17 and the first field of view 41A of the camera, i.e., the area of the sheet 17 covered by the first scan of the camera in this position and bounded by the dotted lines having, in a clockwise direction, the corner points 61, 62, 63, and 64, is scanned. As is well known to the art the scanned information is passed to data processing equipment (not shown) and entered into a suitable storage means (not shown). This first field of view 41a includes four of the laser spots 31, 32, 36 and 37 beamed against the sheet 17 by the projectors as discussed above and as shown in FIG. 1. The data processor is now programmed to seek each of the laser beam alignment marks in the viewing area and to record their position with respect to the home position of the camera carriage. If desired the first scan area can be made to overlap the edge of the sheet 17 so that the position of the marks 31, 32, 36, and 37 can also be recorded with respect to the edge of the page.

This first scanned area and the portion of message on the sheet 17 included therein is also shown in FIG. 6. After the first field of view 41A has been scanned the camera carriage is stepped to the right, i.e. towards alignment marks 33 and 38, and positioned such that a second field of view 41B, bounded by the dotted lines with corners 65, 66, 67, and 68, is established. It should be noted that this second field of view 41B overlaps the first field of view 41A to the extent that the laser alignment marks 32 and 37 and hence corners 62 and 63 of the first field of view 41A area are also included in this second field of view 41B. The second field of view 41a is also shown in FIG. 7. Again the position of the laser alignment marks are recorded. Now however the alignment marks 33 and 38 are recorded with respect to the previously recorded marks 32 and 37.

Again this image is stored and the stepping, scanning, and recording steps described above continue until the entire first rank, i.e. the entire horizontal width of the sheet 17, having a depth equal to depth of the field of view, has been traversed and scanned. Once the first rank of the sheet 17 has been traversed and scanned the camera carriage is returned to its initial home position or starting point. If desired a sensing means may be provided to assure that the carriage has returned to this home position. During the return of the carriage to the home position the page is indexed transverse to the direction of the carriage movement, i.e., moved vertically, so that the next rank of the sheet 17 can be traversed and scanned. The second rank to be scanned is shown in FIG. 8.

The sheet 17 is indexed vertically a precise amount by the rollers 16A, 16B, 16C, and 16D. The amount the sheet 17 is indexed is also recorded. Preferably the sheet 17 is indexed an amount such that the laser beams that generated the alignment marks 31 through 35 fall in exactly the same position where the marks 36 through 40 were previously displayed. Thus the beams 31A, 32A, 33A and 34A and 35A are shown in FIG. 10 as falling on the same points as did the marks 36, 37, 38, 39 and 40 in the first rank as shown in FIG. 5. Of course, since the sheet 17 has moved, the lower row of spots are also moved with respect to the paper an equal distance. These appear in FIG. 10 as marks 36A, 37A, 38A, 39A, and 40A. Again, the upper spots 31A and 32A fall near the upper edge of the first field of view 41C, of this second rank, and the lower spots 35A and 36A fall near the lower edge of the field of view 41C. It should also be noted that this field of view overlaps a portion of the fields of view 41A and 41B. Again, if desired, this first scan area, in the second rank, can be made to overlap the edge of the sheet 17 so that the position of the marks 31A, 32A, 36A, and 37A can also be recorded with respect to the edge of the page.

The second rank is now scanned and all the information displayed on the sheet 17 as well as the position of the alignment marks 36A, 37A, 38A, 39A, and 40A are stored in memory. This process is repeated until the entire sheet 17 is scanned and stored in memory.

In the event the amount of vertical translation of the sheet 17 by the rollers positions the upper row of marks other than where the lower marks were displayed, the controller, having recorded the position of the marks in the first scan and will provide a suitable compensation factor to correct for any such difference.

Once the entire sheet 17 has been scanned and all the information thereon has been recorded that document can be exactly reproduced.

It should be noted that the camera carriage need not be returned to its initial home position before reading the second rank. At present, scanning programs are available that will permit the next rank to be scanned and read while the camera carriage is being stepped back to the other side of the sheet, i.e., towards the home position.

It should also be noted that due to the higher accuracy of the mechanisms used to transfer the paper over the platen that the widths of the subsequent ranks being scanned can be wider that the ranks shown here.

In accordance with the present invention, the detection of the laser marks now permits a copy to be easily quickly and accurately reproduced even if the position of the scanned head or camera carriage is inaccurately placed due to jarring of the scanner or misplacement due to dirt, temperature change or other such inaccuracy in the equipment.

The information on the sheet 17 is now reproduced as shown in FIGS. 10 and 11. FIG. 10 shows the two images of FIGS. 6 and 7 as they would appear after being reconstructed while FIG. 11 shows all the images shown in FIGS. 6, 7 and 9 as they would appear after reconstruction on a new piece of paper.

It should be noted that although the apparatus uses the alignment marks to reconstruct the scanned images as shown in FIGS. 10 and 11 that the alignment marks do not appear in the reconstructed image since the control used for the reconstruction of the scanned ranks is appropriately programmed to prevent them from being reproduced in the reconstructed image.

FIG. 12 shows a section through a printing head 70 that may be coupled to the camera carriage 20 shown in FIG. 2 in order to print, i.e., replicate, a scanned document.

This printing head may be, for example, a printing device such as an ink jet printer. This head can be located in the same apparatus and appropriately coupled to the camera carriage 20 such that once a document has been scanned a new sheet of material can be entered in the apparatus and the previously scanned document can be replicated thereon by activating the printing head 70.

It should also be obvious this printing head 70 can also be maintained in a separate apparatus but electrically coupled to the camera carriage 20 so that the document being scanned can be replicated in real time, i.e. as the initial document is being scanned a copy of it, the scanned document, is simultaneously being replicated.

This completes the description of the preferred embodiment of the invention. Since changes may be made in the above process without departing from the scope of the invention described herein, it is intended that all the matter contained in the above description or shown in the accompanying drawings shall be interpreted in an illustrative and not in a limiting sense. Thus other alternatives and modifications will now become apparent to those skilled in the art without departing from the spirit and scope of the invention as set forth in the following claims.

What is claimed is:

1. A document scanner comprising:

a platen for supporting a document to be scanned:

a scanning head supported a fixed distance above said support;

said scanning head having a fixed field of view; means for projecting a plurality of alignment marks onto said platen and within said field of view; and means for traversing said head across said platen in a first direction and in a plurality of fixed steps to cause said field of view to traverse said platen.

2. The scanner of claim 1 wherein there is further included means for sequentially advancing a document, placed on said platen, under said head in a direction perpendicular to said first direction.

3. The scanner of claim 1 wherein said means for projecting said plurality of alignment marks comprises a laser beam apparatus.

4. The scanner of claim 2 wherein said means for transversing said scanning head across said platen comprises a stepping motor for moving the field of view in small, easily locatable segments across the platen.

5. The scanner of claim 4 wherein there is further provided means for projecting a plurality of alignment marks into each of said segments.

6. A document scanner comprising:

a platen for supporting a document to be scanned:

means for projecting a plurality of alignment marks onto a document supported on said platen;

a scanning head supported a fixed distance above said platen on traversing means;

said scanning head having a fixed field of view large enough to include two of said alignment marks; and means for transporting said head across said platen and hence across said document supported thereon to cause said field of view to incrementally traverse said document in a plurality of fixed steps.

7. The scanning apparatus of claim 6 wherein:

said means for transporting said head comprises a stepping motor to move the field of view in steps across the horizontal dimension of the document being scanned.

8. The apparatus of claim 7 wherein:

the field of view in each step document includes a pair of said alignment marks.

9. The apparatus of claim 8 wherein:

the scanning apparatus further includes a printing head for reproducing said scanned image.

10. The apparatus of claim 9 wherein:

said printing head is remote from said scanning head.

* * * * *